UNITED STATES PATENT OFFICE.

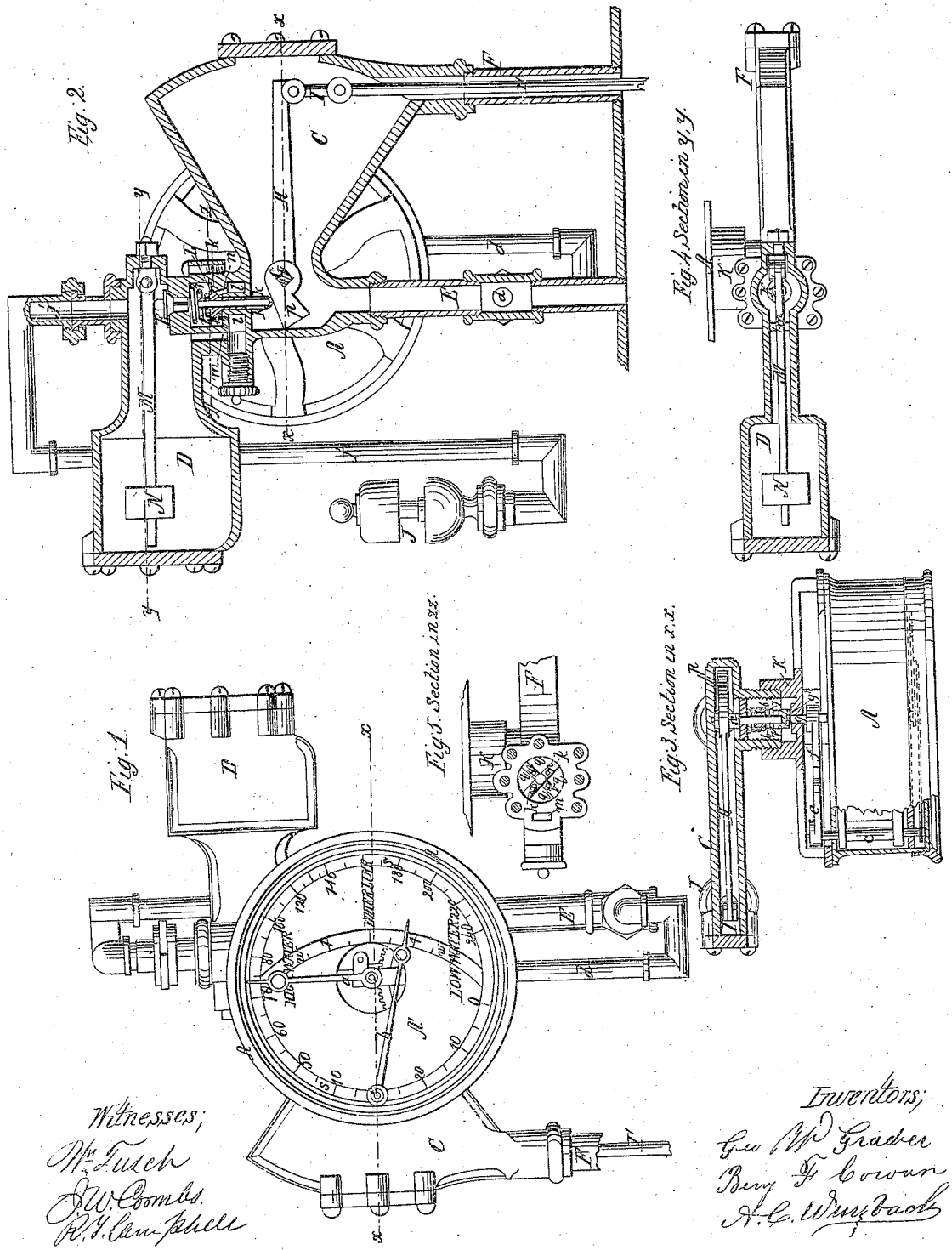

GEO. W. GRAEBER, BENJ. F. COWAN, AND A. C. WURZBACH, OF MEMPHIS, TENNESSEE.

GAGE FOR STEAM-BOILERS.

Specification of Letters Patent No. 27,364, dated March 6, 1860.

*To all whom it may concern:*

Be it known that we, GEORGE W. GRAEBER, BENJAMIN F. COWAN, and A. C. WURZBACH, all of Memphis, in the county of Shelby and State of Tennessee, have invented certain new and useful Improvements in Combined Steam and Water Alarm-Gages for Steam-Boilers; and we do hereby declare that the following is a full, clear, and exact description of the same, reference being had to the accompanying drawings, forming part of this specification, in which—

Figure 1 is a front view of a combined steam and water alarm gage for steam-boilers. Fig. 2 is a vertical section of the same. Figs. 3, 4 and 5 are horizontal sections in the planes indicated by the lines $x\ x$, $y\ y$, and $z\ z$, in Figs. 1 and 2.

Similar characters of reference indicate corresponding parts in the several figures.

This invention consists in a novel system of valves and passages by which steam is admitted to act upon a whistle, or other equivalent device, to sound an alarm in case of the water getting too low, or the pressure of steam too high in a boiler.

To enable others skilled in the art to make and use our invention we will proceed to describe its construction and operation.

A, is a steam gage of the ordinary kind, in which the pressure is indicated by an index $a$, or circular scale $s$, on the dial A′. On the same dial is a scale $w$, on which the water level is indicated by an index $b$, said scale $w$, being arranged so as to be distinctly distinguished from the scale $s$. The said index $b$, is attached to an arbor or shaft $c$, which is geared with mechanism connected with a float, not represented in the drawing. The steam gage A, is attached to one side of the casing C D, which contains the mechanism which connects or gears the float with the arbor $c$, and the valves by which the steam is admitted to sound the alarm whistle J, when the water gets too low, or the pressure of steam too high in the boiler. There is no direct communication between the steam gage A, and the casing C D, except that the said gage receives steam through a pipe $d$, which branches off from one of the two open pipes E, and F, by which the said casing is attached to the top of the boiler or of a separate tank arranged outside of and in communication with the boiler to contain the float. The arbor $c$, of the water index $b$, is fitted to bearings in the box of the steam gage A, and is furnished at the back of the said box with a toothed sector $e$, which gears with a similar toothed sector $f$, on an arbor G $g$, which is fitted to work in bearings in the casing C D, and which has attached to it within the said casing, the lever H, to which the float is attached by a link I, and a rod I′, the latter passing through the pipe F. To prevent any leakage of steam from the casing C D, around the arbor G $g$, the said arbor is made of the two separate pieces G, and $g$, (shown in Fig. 3) of which the latter has the sector $f$, and the former the lever H, attached. The piece $g$, is bored centrally to receive a portion of the piece G, which is fitted loosely into it, and it is made with a conical valve-like shoulder $g'$, (shown in Fig. 3) to fit to a corresponding seat in the cap K, of the casing by which the steam gage A, is attached, and the said piece $g$, has a spring $h$, so applied to it within the casing C D, as to press the valve-like face against its seat, and make a tight working joint between them. In order that the piece G, as it is turned by the rise and fall of the float, may carry the piece $g$, and the sector $f$, around with it, the bored portion of the piece $g$, is provided with opposite longitudinal slots 6, 6, to receive the projecting portions of a pin 7, which is inserted through the piece $g$. The float as it rises or falls with every variation of the level of the water in the boiler operates through the rod I′, link I, lever H, arbor G $g$, sectors $f$, and $e$, and arbor $c$, upon the index $b$, to show the correct level on the scale B.

The casing C D, consists of two separate chambers C, and D, of which C, is always kept filled with steam by the pipes E, and F, which are always open to the boiler, but D, never has steam admitted to it, but to sound the alarm whistle J, which is connected with the top of it by a pipe J′. There are two separate and independent means of communication between these two chambers, viz: one through a safety valve K, and the other through a puppet valve L, (Fig. 2) arranged in a seat $i$, below the seat $j$, of the said safety valve. The safety valve is for admitting steam to the chamber D, to give the alarm when the pressure of steam in the boiler is too high, and the valve L, for admitting steam to do the same thing when the water is too low. The safety valve K, is loaded to the pressure at which the alarm is desired to be sounded by a lever M, and weight N, within the said chamber. To prevent the lower valve L, obstructing the passage of steam to the safety valve it has its stem made tubular, open at the top and with openings $k, k$, in the lower parts of its sides that the steam may pass freely through it, and always reach the under side of the safety valve. The means of communication opened by the valve L, consists of a number of ports $n, n$, in its seat $k$, leading to an annular chamber $l$, below the said seat and a passage $m$, leading from the said annular chamber to the chamber D. The lever H, is so formed (as shown in Fig. 2) with a toe $p$, that as the float arrives at the lowest safe level, the said toe comes in contact with the bottom of the stem of the valve L, and raises it and so allows the steam to pass from the space between it and the safety valve through the ports $n, n$, the annular chamber $l$, and the passage $m$, to the chamber D, from whence it reaches the whistle and gives the alarm, which continues till the water rises again to such a level that by the rise of the float the lever is moved out of contact with the stem of the valve L, and the said valve is allowed to close again. The valve L, is very nearly balanced, its seat having a number of cavities $q, q$, formed in it between the ports $n, n$, as shown in Fig. 5, to leave a great portion of its face exposed to the steam as well as the whole upper surface of the head. A spring $r$, is applied above the valve, as shown in Fig. 2, to insure its being held to its seat until it is operated upon by the lever H, to give the alarm and to close it when the said lever is caused to leave its stem by the rise of the float.

It may be well here to state that only one of the pipes E, F, viz: the pipe F, is necessary to admit steam to the chamber C, but as some support is necessary in about the position occupied by the pipe E, and it is desirable that this support shall expand equally or nearly so with the pipe F, we make such support a steam pipe.

What we claim as our invention, and desire to secure by Letters Patent, is:—

The arrangement of the hollow water alarm valve L, and its seat $k$, and passages $n, l, m$, in combination with the chambers C, and D, and steam alarm valve K, substantially as herein described, to form separate means of communication with the same whistle, or its equivalent, for the water and steam alarms.

GEO. W. GRAEBER.
BENJ. F. COWAN.
A. C. WURZBACH.

Witnesses:
 WM. TUSCH,
 J. W. COOMBS,
 R. G. CAMPBELL.